(12) United States Patent
Dopilka et al.

(10) Patent No.: US 9,500,868 B2
(45) Date of Patent: Nov. 22, 2016

(54) SPACE SUIT HELMET DISPLAY SYSTEM

(71) Applicant: HONEYWELL INTERNATIONAL INC., Morristown, NJ (US)

(72) Inventors: David J. Dopilka, Glendale, AZ (US); Daryl Schuck, Seabrook, TX (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 75 days.

(21) Appl. No.: 14/327,641

(22) Filed: Jul. 10, 2014

(65) Prior Publication Data

US 2016/0011418 A1  Jan. 14, 2016

(51) Int. Cl.
*G02B 27/01* (2006.01)
*G06F 3/01* (2006.01)

(52) U.S. Cl.
CPC .......... *G02B 27/0172* (2013.01); *G06F 3/013* (2013.01); *G02B 2027/0123* (2013.01); *G02B 2027/0127* (2013.01); *G02B 2027/0187* (2013.01)

(58) Field of Classification Search
None
See application file for complete search history.

(56) References Cited

U.S. PATENT DOCUMENTS

| | | | |
|---|---|---|---|
| 4,153,913 A | 5/1979 | Swift | |
| 4,156,292 A | 5/1979 | Helm et al. | |
| 4,269,476 A | 5/1981 | Gauthier et al. | |
| 4,722,101 A | 2/1988 | Blower | |
| 4,722,601 A | 2/1988 | McFarlane | |
| 4,743,200 A | 5/1988 | Welch et al. | |
| 4,842,224 A | 6/1989 | Cohen | |
| 4,897,715 A | 1/1990 | Beamon, III | |
| 4,902,116 A | 2/1990 | Ellis | |
| 4,988,976 A | 1/1991 | Lu | |
| 5,000,544 A | 3/1991 | Staveley | |
| 5,079,753 A | 1/1992 | Suggs | |
| 5,251,333 A | 10/1993 | Tsook | |
| 5,301,668 A | 4/1994 | Hales | |
| 5,420,828 A | 5/1995 | Geiger | |
| 5,453,877 A | 9/1995 | Gerbe et al. | |
| 5,537,092 A | 7/1996 | Suzuki et al. | |
| 5,856,811 A | 1/1999 | Shih et al. | |
| 6,008,780 A | 12/1999 | Clarke et al. | |
| 6,140,980 A | 10/2000 | Spitzer et al. | |
| 6,157,352 A | 12/2000 | Kollin et al. | |
| 6,212,020 B1 | 4/2001 | Ahlgren et al. | |
| 6,230,327 B1 | 5/2001 | Briand et al. | |
| 6,388,638 B2 | 5/2002 | Fukushima et al. | |

(Continued)

FOREIGN PATENT DOCUMENTS

GB  1167617 A  10/1969
WO  2008055974 A1  5/2008

OTHER PUBLICATIONS

Sportvue; Introducing—SportVue MC1, 2005 [http://www.ccbiketech.com/sportvue.asp].
Nuviz; The first Head-Up Display for Motorcycle Helmets, Aug. 31, 2013 [https://www.kickstarter.com/projects/nuviz/the-first-head-up-display-for-motorcycle-helmets].
Hodgson; Requirements and Potential for Enhanced EVA Information Interfaces; SAE International, Jan. 2013 [http://mvl.mit.edu/MVLpubs/Hodgson2003.pdf].

(Continued)

*Primary Examiner* — Kenneth B Lee, Jr.
(74) *Attorney, Agent, or Firm* — Lorenz & Kopf, LLP

(57) ABSTRACT

A space suit helmet capable of meeting the demands of future space suit helmet display requirements in a decoupled-helmet, helmet-mounted design with sufficient eye relief is provided. A display system and a redirecting assembly are coupled together and mounted to the helmet. The display system generates an image and the redirecting assembly orients the image with respect to a predetermined valid eye location volume within the helmet.

6 Claims, 5 Drawing Sheets

(56) References Cited

U.S. PATENT DOCUMENTS

| | | | |
|---|---|---|---|
| 6,483,646 | B2 | 11/2002 | Scott et al. |
| 6,747,611 | B1 | 6/2004 | Budd et al. |
| 6,934,633 | B1 | 8/2005 | Gallagher et al. |
| 7,477,207 | B2 | 1/2009 | Estep |
| 7,542,210 | B2 | 6/2009 | Chirieleison, Sr. |
| 8,952,889 | B2 | 2/2015 | Jacobsen et al. |
| 8,988,463 | B2 * | 3/2015 | Stone Perez ....... G02B 27/0172 345/629 |
| 2010/0096491 | A1 | 4/2010 | Whitelaw et al. |
| 2012/0139817 | A1 * | 6/2012 | Freeman ............ G02B 27/0172 345/8 |
| 2012/0165676 | A1 * | 6/2012 | Njemanze ................ A61B 8/06 600/454 |
| 2012/0235902 | A1 | 9/2012 | Eisenhardt et al. |
| 2013/0044043 | A1 | 2/2013 | Abdollahi et al. |
| 2013/0305437 | A1 | 11/2013 | Weller et al. |
| 2014/0009367 | A1 | 1/2014 | Lvovskiy et al. |
| 2014/0118829 | A1 | 5/2014 | Ma et al. |
| 2015/0002375 | A1 | 1/2015 | Williams |

OTHER PUBLICATIONS

Elbit; Displays: Color helmet-mounted display for Air Force CV-22 tiltrotor special-ops aircraft to come from Elbit Systems, Jan. 1, 2012 [http://www.militaryaerospace.com/articles/print/volume-23/issue-1/product-applications/displays-color-helmet-mounted-display-for-air-force-cv-22-tiltrotorspecial-ops-aircraft-to-come-from-elbit-systems.html].

Mardon, A.A.; The Utilization of Helmet Mounted Display (HMO) In Space Extra-Vehicular Suits and Lunar Extra-Vehicular Surface Suits, University of North Dakota, 1992 [http://articles.adsabs.harvard.edu/full/seri/LPI../0023//0000839.000.html].

Graziosi, D. et al.; I-Suit Advanced Spacesuit Design Improvements and Performance Testing, ILC Dover, Inc., 2003 [http://spacecraft.ssl.umd.edu/design_lib/ICES03-2443.I-Suit_tests.pdf].

Dillow, C.; NASA's Next-Gen Spacesuit Could Have an In-Helmet Display, Recon Instruments, Jun. 3, 2011 [http://www.popsci.com/technology/article/2011-06/nasas-next-gen-spacesuit-could-have-helmet-display].

Recon Jet; ReconJet The first heads up display for sports, Jan. 2014 [http://reconinstruments.com/products/jet].

* cited by examiner

SPACE SUIT HELMET DISPLAY SYSTEM

TECHNICAL FIELD

Embodiments of the subject matter described herein relate generally to helmet display systems and, more particularly, to helmet display systems suitable for use in space suits.

BACKGROUND

Enhanced helmet display requirements, for example, those promulgated by the National Aeronautics and Space Administration (NASA), have been imposed on the next generation of space suits suitable for extra-vehicular activity (EVA). Some non-limiting examples of the new requirements include full color graphical displays including continually updated procedures, checklists, photo imagery, and video. Current space suits that are suitable for extra-vehicular activity (EVA) generally utilize small one line, 12 character alpha-numeric display panels located on the external surface of the space suit, often in the chest or trunk area, and display a limited set of suit system data. While current display technology may satisfy the image-generating requirements of new space suit helmet displays, current head and helmet mounted display system designs are insufficient for the next generation spacesuit.

Currently, head and helmet mounted display systems position a display element at a fixed location with respect to the user's eye, allowing the user to readily view the displayed information with minimal strain or occlusion of the environment. A head mounted display system enables the display element of the display system to move with the user's head while remaining at a fixed position with respect to the user's eye. A traditional helmet mounted display, such as for a motorcycle helmet, also enables the display element to move with the user's head while remaining at a fixed position with respect to the user's eye because the helmet is secured to the user's head. As used herein, a helmet is described as conformal to the user's head if it is secured to the head in a way that allows a helmet display element to remain at a fixed location with respect to the user's eye as the user's head moves around. Conformal helmets reduce the amount of eye/display misalignment that must be accommodated for in the display system design and also permits positioning the display element closer to the eye, supporting a shorter "eye relief," defined as the distance from the pupil of the user's eye to the final optic in the display system.

While the above described head and helmet mounted display systems offer distinct advantages, issues that are unique to space suit helmets make direct adoption of the above display system designs impractical. First, having the astronaut wear anything mounted to his head within his helmet is strongly disfavored due to the inability to adjust or reposition it, the additional time required to don or doff the suit over head mounted equipment, and being a potential impact hazard as the astronaut's head moves within the helmet. It can also be readily appreciated that placing electronics inside the oxygen-rich, pressurized, bubble of the space suit helmet increases fire risk and the associated cost of performing quality assurance testing. Next, unlike motorcycle helmets, a space suit helmet is non-conformal; therefore mounting a display system to the helmet introduces misalignment issues as the astronaut's head moves around within the helmet. Finally, space suit helmets are typically larger than traditional helmets, therefore imposing a longer eye relief on a viable display system.

Consequently, a space suit helmet display system capable of meeting the demands of future space suit helmet display requirements in a decoupled-helmet, helmet-mounted design with sufficient eye relief is desirable.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

A helmet suitable for use in space is provided. A display system is mounted to the helmet and a redirecting assembly is coupled to the display system for orienting an image with respect to a predetermined valid eye location volume within the helmet.

A display system mounted to a helmet is also provided. The display system creates, for a predetermined valid eye location volume within the helmet, a virtual image. The display system includes a display device and a processor module coupled to the display device and configured to command the display device to generate an image. The display system also includes a redirecting assembly coupled to the display device and configured to create, at the predetermined valid eye location volume, the virtual image representative of the generated image.

A method for redirecting an image generated on an externally mounted helmet display system to a predetermined location within the helmet is also provided. The method includes generating the image, reflecting the image toward the predetermined location using a mirror, and adjusting the image to a virtual image distance using a focusing lens.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived by referring to the following Detailed Description and Claims when considered in conjunction with the following figures, wherein like reference numerals refer to similar elements throughout the figures, and wherein:

DETAILED DESCRIPTION

Figure 1:
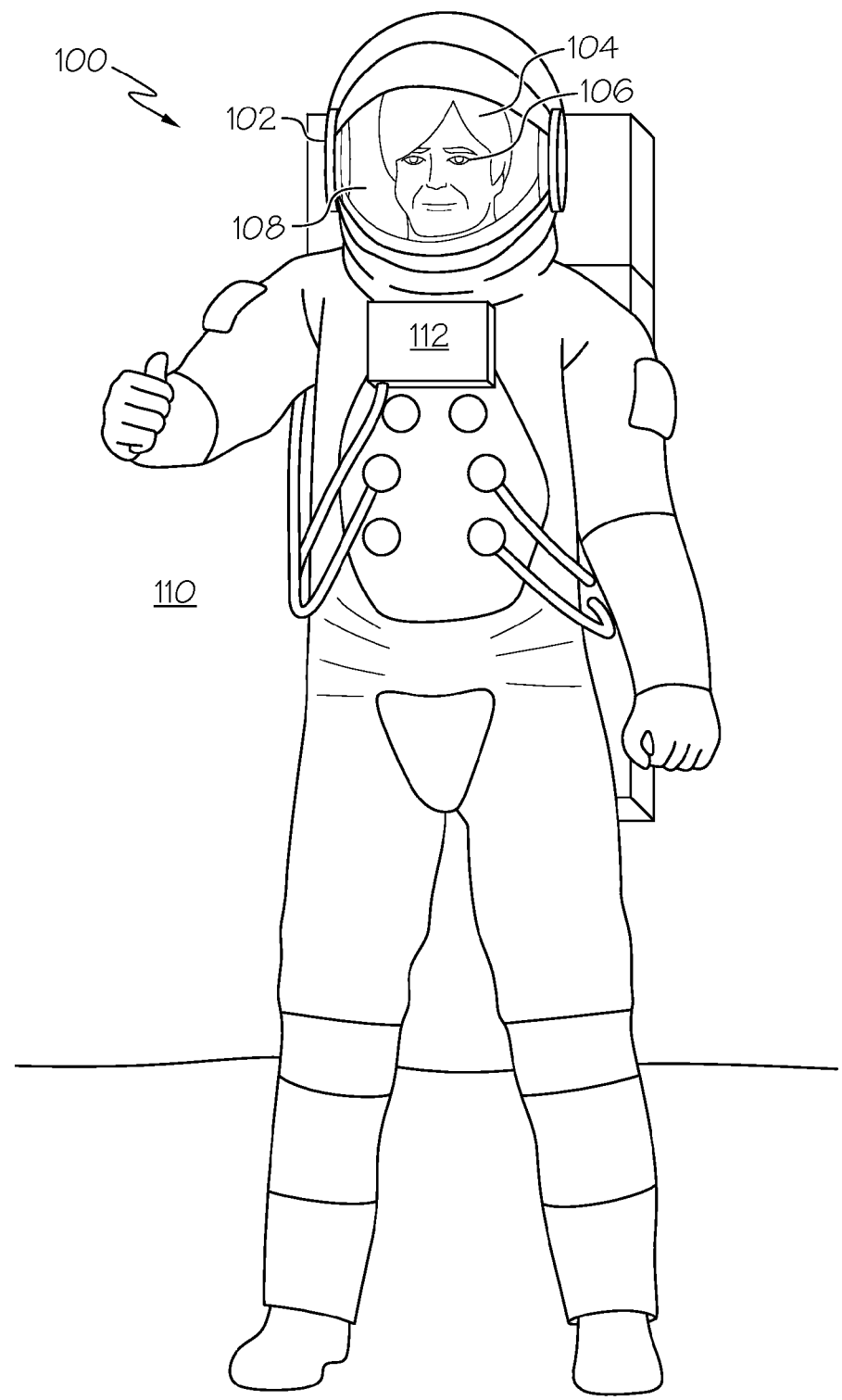
FIG. 1 is an illustration of an exemplary space suit having a decoupled helmet.

The following Detailed Description is merely exemplary in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over any other implementations. Furthermore, there is no intention to be bound by any expressed or implied theory presented in the preceding Technical Field, Background, Brief Summary or the following Detailed Description.

For the sake of brevity, conventional techniques related to graphics and image processing, sensors, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Techniques and technologies may be described herein in terms of functional and/or logical block components and with reference to symbolic representations of operations, processing tasks, and functions that may be performed by various computing components or devices. Such operations, tasks, and functions are sometimes referred to as being processor-executed, computer-executed, computerized, software-implemented, or computer-implemented. In practice, one or more processor devices can carry out the described operations, tasks, and functions by manipulating electrical signals representing data bits at memory locations in the processor electronics of the display system, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following descriptions may refer to elements or nodes or features being "coupled" together. As used herein, and consistent with the helmet discussion hereinabove, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

The embodiment described herein is merely an example and serves as a guide for implementing the novel systems and methods herein on any helmet display system in any terrestrial, water, hazardous atmospheres, avionics or astronautics application. It is readily appreciated that space suits and space suit helmets are designed to meet a plurality of environmental and safety standards beyond the scope of the examples presented below. As such, the examples presented herein are intended as non-limiting.

FIG. 1 is an illustration of an exemplary space suit 100 having a decoupled helmet 102. The astronaut's head 104 is within a pressurized oxygen-rich atmosphere 108 protected by the bubble of the helmet 102. The astronaut's head 104 and eye 106 is viewable through a transparent portion of the helmet 102. In traditional space suits, an alpha-numeric display 112 may be placed on the external surface of the space suit 100.

Figure 2:
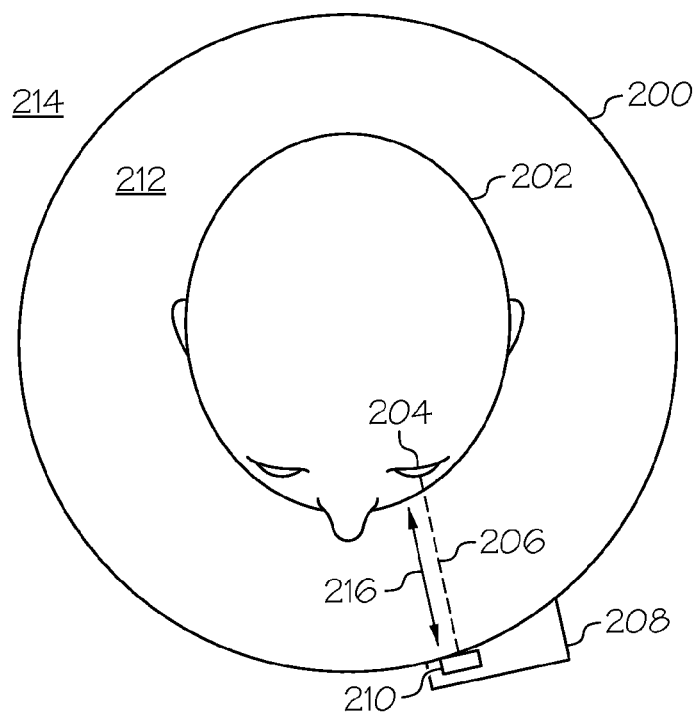
FIG. 2 is a simplified top down illustration of an astronaut's head inside a helmet according to an exemplary embodiment.

FIG. 2 is a simplified top down illustration of an astronaut's head 202 inside a helmet 200 according to an exemplary embodiment. FIG. 2 is not to scale, but provides an example of the relative placement of features; additionally, although helmet 200 may comprise multiple layers and various shapes, the embodiment depicts helmet 200 as a circular barrier around the astronaut's head 202 that protects a pressurized bubble of oxygen-rich atmosphere 212 for the astronaut from the atmosphere 214, or lack thereof. The astronaut's eye 204 is shown having a direct viewing path 206 to the focusing lens assembly 210 located within housing 208. The distance between the pupil of the eye 204 and the focusing lens assembly 210 is a first predetermined distance, referred to as the first eye relief 216.

Housing 208 may include other features of the display system. It is readily appreciated that housing 208 may be of any shape or volume, material, transparency or orientation that is suitable to meet the environmental and design requirements of the space suit helmet display system. Additionally, the housing 208 or individual components of the display system may be placed at any location on the helmet, and may be designed to operate with the right or left eye individually or placed centrally so that either eye may comfortably view the image generated by a single display.

Figure 3:
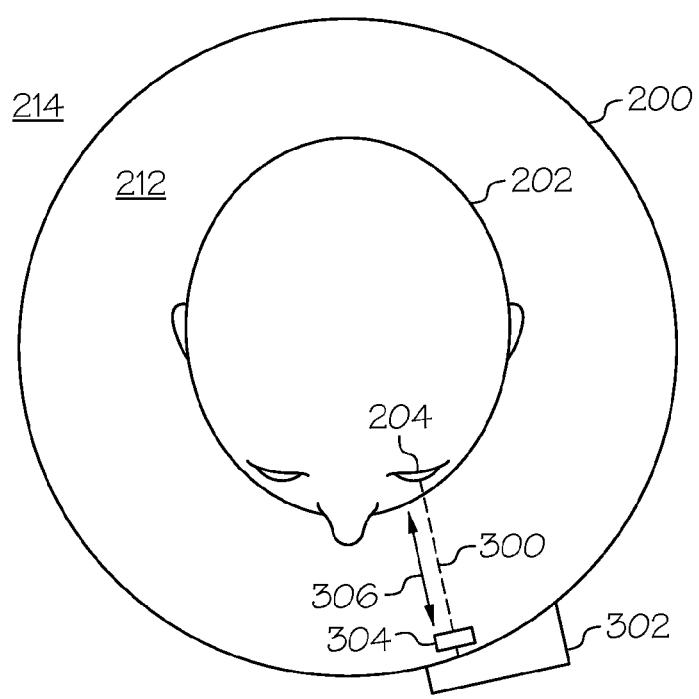
FIG. 3 is a simplified top down illustration of an astronaut's head inside a helmet according to another exemplary embodiment.

FIG. 3 is a simplified top down illustration of an astronaut's head 202 inside a helmet 200 according to another exemplary embodiment. FIG. 3 is also not to scale, but provides a variation in the relative placement of features over the embodiment of FIG. 2. Helmet 200 and astronaut's head 202 are the same as in FIG. 2. The astronaut's eye 204 is shown having a direct viewing path 300 to a focusing lens assembly 304 that is placed within the bubble of the helmet 200, and separate from, but coupled to, the housing 302 that may also include other features of the display system. This change in the placement of focusing lens assembly 304 reduces the distance between the eye 204 and the focusing lens assembly 304 from the length required by the first embodiment (first predetermined distance, eye relief 216 in FIG. 2) to a second predetermined distance referred to as the second eye relief 306.

As described in connection with FIG. 2 above, it is readily appreciated that housing 302 may include the other features of the helmet display system and may be of any shape or volume, material, transparency or orientation that is suitable to meet the environmental and design requirements of the space suit helmet display system. Additionally, individual components of the display system may be placed at any location on the helmet, and may be designed to operate with the right or left eye individually or placed centrally so that either eye may comfortably view the image generated by a single display.

Figure 4:
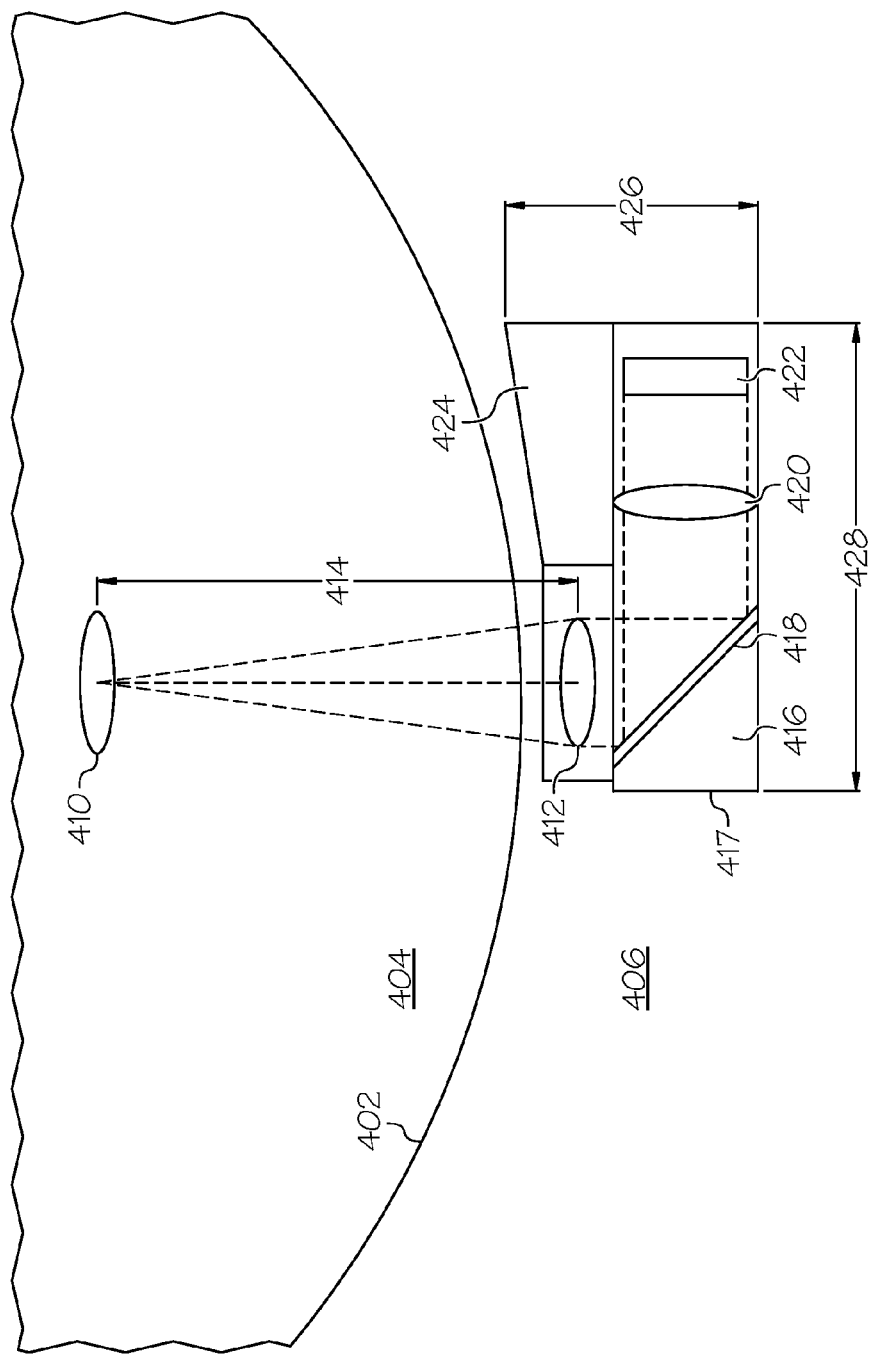
FIG. 4 is an expanded top down illustration providing additional detail of the embodiment depicted in FIG. 2.

FIG. 4 is an expanded top down illustration providing additional detail of the embodiment depicted in FIG. 2. As in FIGS. 2 and 3, an oxygen-rich environment 404 is maintained for the astronaut within a helmet bubble 402 that may be comprised of multiple layers.

FIG. 4 is not to scale, but is useful to comprehend the relative placement of features of this embodiment. An astronaut's eye 410 is shown at eye relief 414 from a focusing lens assembly 412. The focusing lens assembly 412 may be included in a display system 416 that may be enclosed in housing 417. Display system 416 typically includes additional components, such as mirror 418, collimating relay lens assembly 420, display device 422 and processor module 424. The housing 417 that encloses the display system 416 is shown having a depth 426 and width 428. FIG. 4 is two-dimensional, therefore other potential housing measurements in a third dimension are not shown, but it is to be understood that the housing may be a three dimensional volume. As described above, it is readily appreciated that housing 417 may be of any shape or volume, material, transparency or orientation that is suitable to meet the environmental and design requirements. Additionally, individual components of the display system may be placed at any location on the helmet, and may be designed to operate with the right or left eye individually or placed centrally so that either eye may comfortably view the image generated by a single display.

The processor module 424 may be implemented or realized with at least one general purpose processor device, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. As described in more detail below, the processor module 424 is configured to drive the display functions of the display device 422, and is in communication with various electronic systems included in the space suit.

The processor module 424 may include or cooperate with an appropriate amount of memory (not shown), which can be realized as RAM memory, flash memory, EPROM memory, EEPROM memory, registers, a hard disk, a removable disk, a CD-ROM, or any other form of storage medium known in the art. In this regard, the memory can be coupled to the processor module 424 such that the processor module 424 can read information from, and write information to, the memory. In the alternative, the memory may be integral to the processor module 424. In practice, a functional or logical module/component of the system described here might be realized using program code that is maintained in the memory. Moreover, the memory can be used to store data utilized to support the operation of the system, as will become apparent from the following description.

No matter how the processor module 424 is specifically implemented, it is in operable communication with display device 422. Processor module 424 is configured, in response to inputs from various sources of data such as space suit status sensors and environmental sensors (sensing, for example, suit pressure, temperature, voltage, current and the like), to selectively retrieve and process data from the one or more sources and to generate associated display commands. In response, display device 422 selectively renders various types of textual, graphic, and/or iconic information that may be two or three dimensional, and may include three dimensional moving images. For simplifying purposes, the various textual, graphic, and/or iconic data generated by the display device may be referred to herein as an "image."

It will be appreciated that the display device 422 may be implemented using any one of numerous known display devices suitable for rendering textual, graphic, and/or iconic information in a format viewable by the user. Non-limiting examples of such display devices include various light engine displays, organic electroluminescent display (OLED), and flat screen displays such as LCD (liquid crystal display) and TFT (thin film transistor) displays. The display device 422 may additionally be secured or coupled to the housing or to the helmet by any one of numerous known technologies.

A collimating relay lens assembly 420 is oriented between the display device and the mirror. An input surface of the collimating relay lens assembly 420 faces the display device, having unobscured access to images generated by the display device, and creates a sharpened or clarified intermediate virtual image at its output surface. While the collimating relay lens assembly 420 is depicted in FIG. 4 as a single lens, it may include a plurality of lens elements of various types, sizes, and shapes.

Mirror 418 and a focusing lens assembly 412 are oriented to act as the redirecting assembly portion of a display system. Mirror 418 may be any type of mirror, prism, optical combiner, or the like, that redirects the image generated by the display device 422. FIG. 4 depicts the mirror 418 redirecting the image at a substantially ninety degree angle; however various angles are supported by the embodiment. Mirror 418 may also have a degree of transparency that would allow the astronaut to view objects behind the mirror.

The astronaut's gaze lands on focusing lens assembly 412, which serves the purpose of a final display aperture relay lens. Specifically, the focusing lens assembly 412 is positioned at eye relief 414 and configured to create, from the perspective of the astronaut's eye, a focused "virtual image" that appears to be focused at a predetermined virtual image distance. The virtual image is a focused representation of the image generated by the display device 422, which is relayed as an intermediate virtual image, and redirected by the redirecting assembly elements including the mirror 418 and the focusing lens assembly 412. The predetermined virtual image distance may meet any design criteria, and is generally selected to minimize eye strain or adjustment on the part of the astronaut. In some embodiments, the predetermined virtual image distance appears to be from anywhere between about five feet away from the astronaut to infinity. Focusing lens assembly 412 may include a plurality of lenses of various types, sizes, and shapes. In the embodiment depicted, the focusing lens assembly includes at least one collimating lens.

Figure 5:
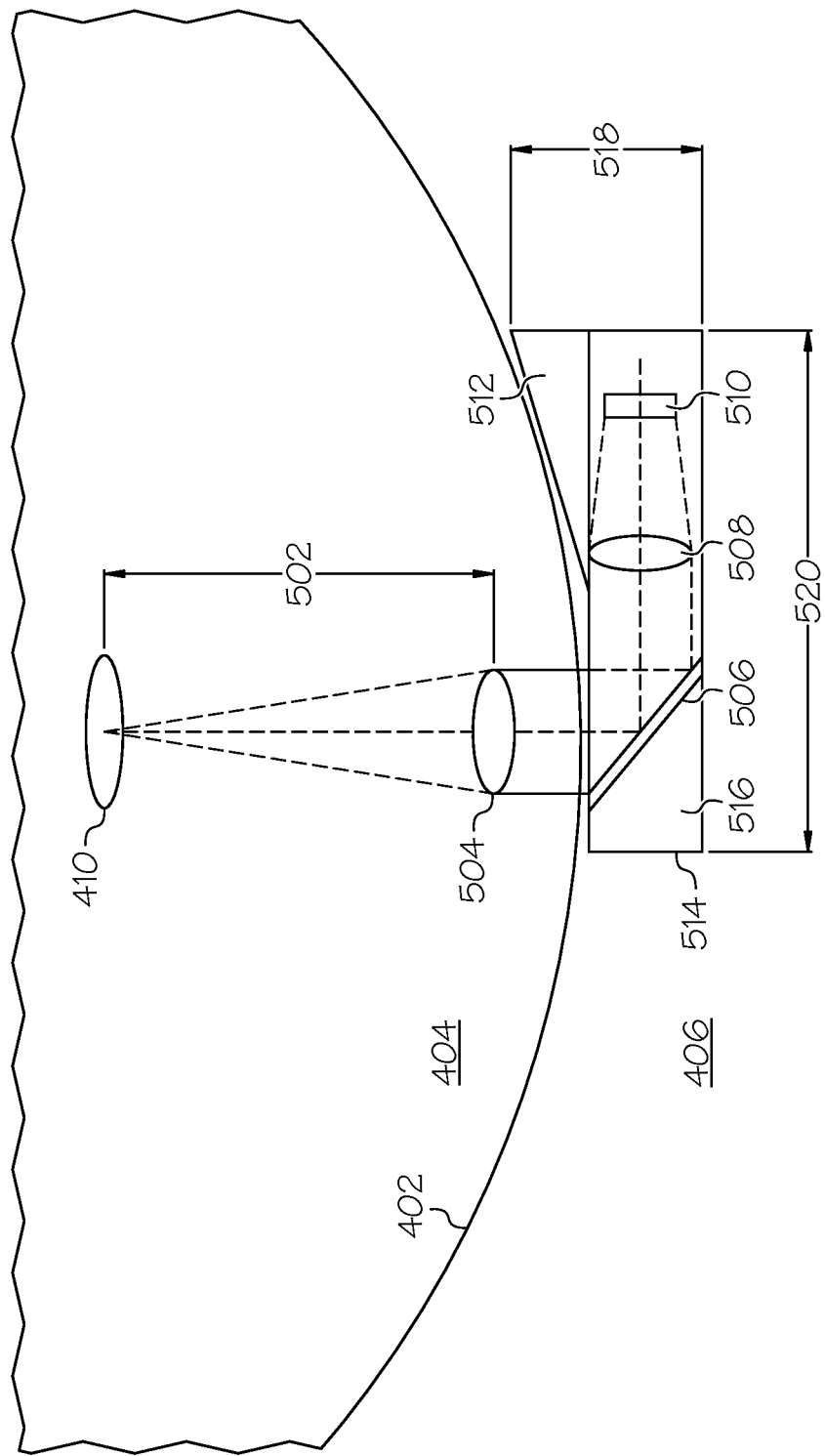
FIG. 5 is an expanded top down illustration providing additional detail of the embodiment depicted in FIG. 3.

FIG. 5 is an expanded top down illustration providing additional detail of the embodiment depicted in FIG. 3. As in FIG. 2-4, an oxygen-rich environment 404 is maintained for the astronaut within a helmet bubble 402 that may be comprised of multiple layers.

In this embodiment, the focusing lens assembly 504 is placed inside the helmet bubble 402.

The astronaut's gaze lands on focusing lens assembly 504, which serves the purpose of a final display aperture relay lens. Specifically, the focusing lens assembly 504 is positioned at eye relief 502 and configured to create, from the perspective of the astronaut's eye, a focused "virtual image" that appears to be focused at a predetermined virtual image distance. The virtual image is a focused representation of the image generated by the display device 510, which is relayed as an intermediate virtual image, and redirected by the redirecting assembly elements including the mirror 506 and the focusing lens assembly 504. The predetermined virtual image distance may meet any design criteria, and is generally selected to minimize eye strain or adjustment on the part of the astronaut. In some embodiments, the predetermined virtual image distance appears to be from anywhere between about five feet away from the astronaut to infinity. Focusing lens assembly 504 may include a plurality of lenses of various types, sizes, and shapes. In the embodiment depicted, the focusing lens assembly includes at least one collimating lens.

The astronaut's eye 410 is shown at eye relief 502 from the focusing lens assembly 504 of the display system 516 that is enclosed in housing 514. Display system 516 includes additional components, such as mirror 506, collimating relay lens assembly 508, display device 510 and processor module 512. The housing 514 that encloses the display system 516 has a depth 518 and width 520. FIG. 5 is two-dimensional, therefore a third dimension of the housing 514 is not shown, but it is to be understood that the housing may be a three dimensional volume of any shape. As described above, it is readily appreciated that housing 514 may be of any shape or volume, material, transparency or orientation that is suitable to meet the environmental and design requirements. Additionally, individual components of the display system may be placed within or without housing, at any location on the helmet, and may be designed to operate with the right or left eye individually or placed centrally so that either eye may comfortably view the image generated by a single display.

Although FIGS. 4 and 5 are not to scale, they are suitable for relative comparisons, and it is readily observable that placing the focusing lens assembly 504 inside the helmet bubble 402 not only offers a shorter eye relief distance, but also permits a more compact design of the housing 514 and the display system elements that are enclosed therein (For example, depth 518 is smaller than depth 426, and display 510 is smaller than display 422, collimating relay lens assembly 508 is smaller than, collimating relay lens assembly 420). As described above, it is readily appreciated that housing 514 may be of any shape or volume, material, transparency or orientation that is suitable to meet the environmental and design requirements. Additionally, individual components of the display system may be placed at any location on the helmet, and may be designed to operate with the right or left eye individually or placed centrally so that either eye may comfortably view the image generated by a single display.

Figure 6:
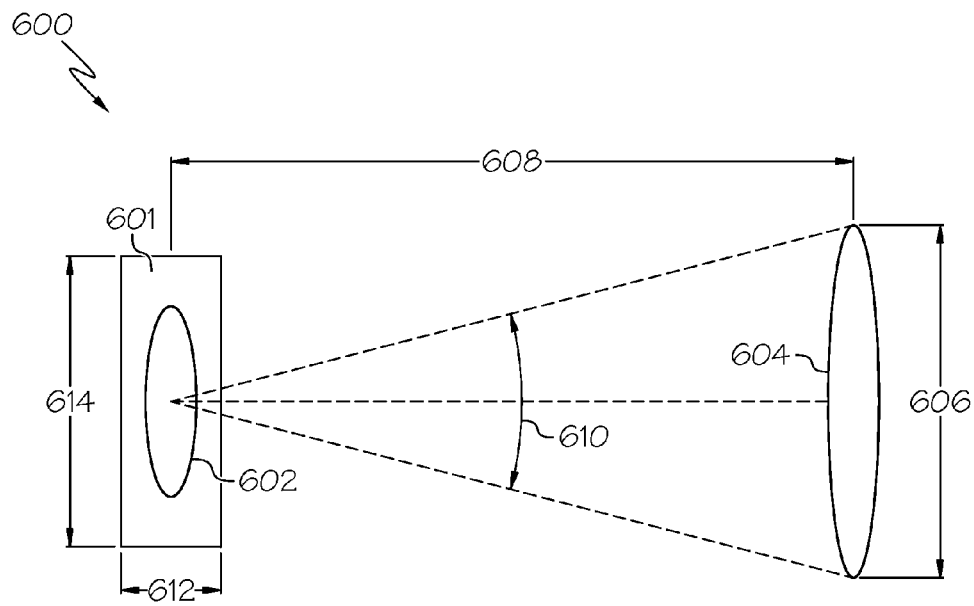
FIG. 6 is an illustration of the orientation of a valid eye location and a focusing lens according to the exemplary embodiment of FIG. 2.

FIG. 6 is an illustration of the orientation of a valid eye location and focusing lens assembly according to the exemplary embodiment of FIG. 4. FIG. 6 is a two dimensional illustration showing a rectangle 601 having a predetermined length 614 and predetermined width 612 that is representative of two of the three dimensions of a valid eye location volume for this embodiment. The display system 416 is operational for an astronaut's eye 602 located anywhere within the valid eye location volume. The valid eye location volume is determined based on biometrics of an astronaut's head within the space suit helmet. In embodiments with a centrally located display system that is comfortably viewable by either eye, the valid eye location volume may be large enough to accommodate both eyes. The focusing lens assembly 604 is configured at eye relief 608 to create a virtual image as described above. While focusing lens assembly may include multiple lenses, FIG. 6 depicts focusing lens assembly 604 made up of a single lens having a diameter 606 that is generally the dimension of a final optic aperture into the display system of this embodiment. A conical viewing volume originating at the astronaut's eye 602 and terminating at the focusing lens assembly 604 is indicated having angle 610.

Figure 7:
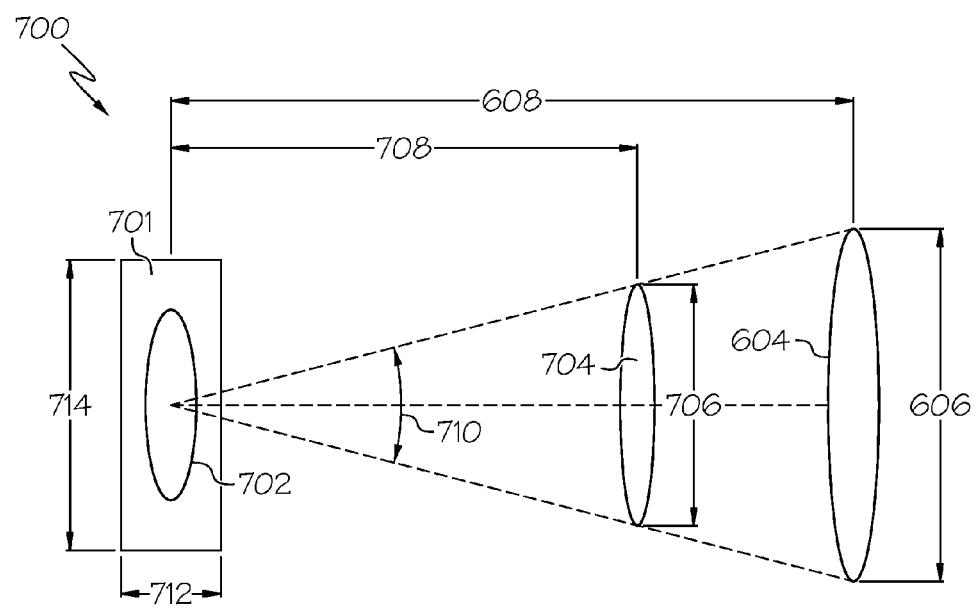
FIG. 7 is an illustration of the orientation of a valid eye location and a focusing lens according to the exemplary embodiment of FIG. 3.

FIG. 7 is an illustration of the orientation of a valid eye location and a focusing lens according to the exemplary embodiment of FIG. 5. FIG. 7 is also a two dimensional illustration showing a rectangle 701 having a predetermined length 714 and predetermined width 712 that is representative of two of the three dimensions of a valid eye location volume for this embodiment. The display system 516 is operational for an astronaut's eye 702 located anywhere within the valid eye location volume. In embodiments with a centrally located display system that is comfortably viewable by either eye, the valid eye location volume may be large enough to accommodate both eyes.

The focusing lens assembly 704 is configured at eye relief 708 to create a virtual image as described above. As described herein, while focusing lens assembly may include multiple lenses, FIG. 7 depicts focusing lens assembly 704 made up of a single lens having a diameter 706. A conical viewing volume originating at the astronaut's eye 702 and terminating at the focusing lens assembly 704 is indicated having angle 710.

Within the display system of each embodiment, the processor module continuously monitors environmental and safety data, suit pressure sensors, temperature sensors, voltage sensors, current sensors and the like. In response to the various inputs, the processor generates appropriate commands for the display device to render various textual, graphic, and/or iconic data as described hereinabove.

Thus, there has been provided a compact space suit helmet display system capable of meeting the demands of future space suit helmet display requirements in a decoupled-helmet, helmet-mounted design. While the described embodiments are simplified to show a singular display system placed at any location on the helmet, embodiments employing one or more display systems simultaneously are supported.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A helmet suitable for use in space, comprising:
a display system mounted to the helmet that is configured to generate an image, the display system comprising a relay lens assembly configured to create an intermediate virtual image;
a processor module configured to command the display system to generate the image; and
a redirecting assembly coupled to the display system for orienting an image with respect to a static predetermined valid eye location volume within the helmet,
wherein the redirecting assembly comprises, (1) a fixed focusing lens assembly configured to create a virtual image based on the intermediate virtual image, the virtual image focused at a static predetermined virtual image distance, the static predetermined virtual image distance being independent of ambient scenery, and (2) a first mirror oriented to redirect the intermediate virtual image toward the predetermined valid eye location volume.

2. The helmet of claim 1, wherein the fixed focusing lens assembly is located at a static first predetermined distance from the predetermined valid eye location volume.

3. The helmet of claim 2, wherein the display system and redirecting assembly are enclosed within an externally mounted housing.

4. The helmet of claim 1, wherein the fixed focusing lens assembly is located at a static second predetermined distance from the predetermined valid eye location volume.

5. The helmet of claim 4 wherein:
the fixed focusing lens assembly is located within the helmet; and
the display system and first mirror are located in housing mounted on an external surface of the helmet.

6. The helmet of claim 1, wherein the image comprises a three dimensional, moving image.

\* \* \* \* \*